United States Patent [19]

Spence

[11] Patent Number: 4,679,708

[45] Date of Patent: Jul. 14, 1987

[54] UNIFORM MATERIAL DISCHARGE APPARATUS

[75] Inventor: James F. Spence, Elgin, Ill.

[73] Assignee: General Kinematics Corporation, Barrington, Ill.

[21] Appl. No.: 818,973

[22] Filed: Jan. 15, 1986

[51] Int. Cl.[4] ............................................. B67D 5/64
[52] U.S. Cl. ................................... 222/161; 198/757; 198/771; 222/196; 222/424; 222/547
[58] Field of Search ................... 198/757, 756, 771; 222/109, 161, 196, 199, 408, 424, 168, 410, 564, 547, 52, 318; 209/657

[56] References Cited

U.S. PATENT DOCUMENTS

| | | | |
|---|---|---|---|
| 3,012,697 | 12/1961 | Rouse et al. | 222/196 |
| 3,178,068 | 4/1965 | Dumbaugh | 222/161 |
| 3,300,098 | 1/1967 | Quester et al. | 222/196 |
| 4,361,254 | 11/1982 | Teraoku et al. | 222/196 |

FOREIGN PATENT DOCUMENTS 1012589 12/1965 United Kingdom ............... 222/547

*Primary Examiner*—H. Grant Skaggs
*Attorney, Agent, or Firm*—Wood, Dalton, Phillips, Mason & Rowe

[57] ABSTRACT

A material discharge apparatus including a hopper having a flow path leading to a discharge opening. The apparatus includes a pair of vibration generators tuned to move material along the flow path toward the discharge opening. The apparatus also includes a gate or bypass for adjustably controlling the rate material is discharged through the discharge opening onto a conveyor. With this construction, the gate or bypass causes any material in excess of the preselected rate of discharge of material from the discharge opening to be recirculated to the flow path.

10 Claims, 5 Drawing Figures

UNIFORM MATERIAL DISCHARGE APPARATUS

FEILD OF THE INVENTION

The present invention generally relates to a material discharge apparatus and, more particularly, to uniform material discharge from a hopper.

BACKGROUND OF THE INVENTION

In the design of hoppers for bulk materials such as animal feed, the hoppers usually include discharge openings through which the bulk material passes onto conveyors. Frequently, there is uneven discharge of the material from the hopper, i.e., it has been found that too much material (a surge) is discharged at some points in time whereas too little material is discharged at other times. As a result, the uneven discharge causes an uneven delivery of material by the conveyor provided to carry the material to another location remote from the hopper.

In surge feeders, it is generally recognized that it is desirable to deliver animal feed at a uniform rate. It is, therefore, necessary to provide means associated with the hopper for assuring that the feed will be discharged onto the conveyor at a uniform rate, i.e., there will be no unbalanced flow or surges of material. Accordingly, the present invention is directed to overcoming one or more of the problems and accomplishing one or more of the objects set forth above.

SUMMARY OF THE INVENTION

In accordance with the present invention, a material discharge apparatus is provided having a hopper with a flow path leading to a discharge opening. Vibratory apparatus is provided for vibrating the hopper to move material along the flow path toward the discharge opening. A conveyor or chute is disposed below the discharge opening in the hopper for receiving material passing through the opening as it moves along the flow path. Novel apparatus is provided for discharging material through the discharge opening at a preselected uniform rate. In particular, the novel material discharging apparatus limits material discharge to no more than the preselected uniform rate, independent of the rate at which material actually reaches the discharge opening, and provides for recirculating to the flow path any surplus material that reaches the discharge opening.

In an exemplary embodiment, the hopper is resiliently mounted, is manually or mechanically loadable, and is circular in shape. The hopper has a circular trough defining a continuous flow path leading to a discharge opening in the trough. The vibratory apparatus causes the hopper to move material along the circular trough toward the discharge opening. The vibratory apparatus is adjustable to vary the rate at which material reaches the discharge opening. In addition, the conveyor or chute is mounted below the discharge opening and extends away from the circular trough.

Preferably, the hopper includes a centrally disposed elevated conical feeder surface substantially coextensive with the circular trough. The feeder surface is constructed such that it is adapted to direct loaded material into the circular trough for movement along the continuous flow path to the discharge opening. As a result, the hopper can be maintained in a fully loaded condition while ensuring delivery of material to the conveyor or chute at a preselected uniform rate.

In the preferred embodiment, this is accomplished by utilizing a vertically adjustable gate disposed over the discharge opening and having a generally horizontal surface portion overlapping the discharge opening in generally parallel spaced relation to the circular trough. With this construction, the horizontal surface portion carries any surplus material over the discharge opening to the circular trough at the start of the continuous flow path, i.e., the gate comprises apparatus for recirculating surplus material by bypassing the discharge opening.

Other objects, advantages and features of the present invention will become apparent from the following specification taken in conjunction with the accompanying drawings.

BREIF DESCRIPTION OF THE DRAWINGS

DETAILED DESCRIPTION OF THE PREFERRED EMBODIMENT

Figure 1:
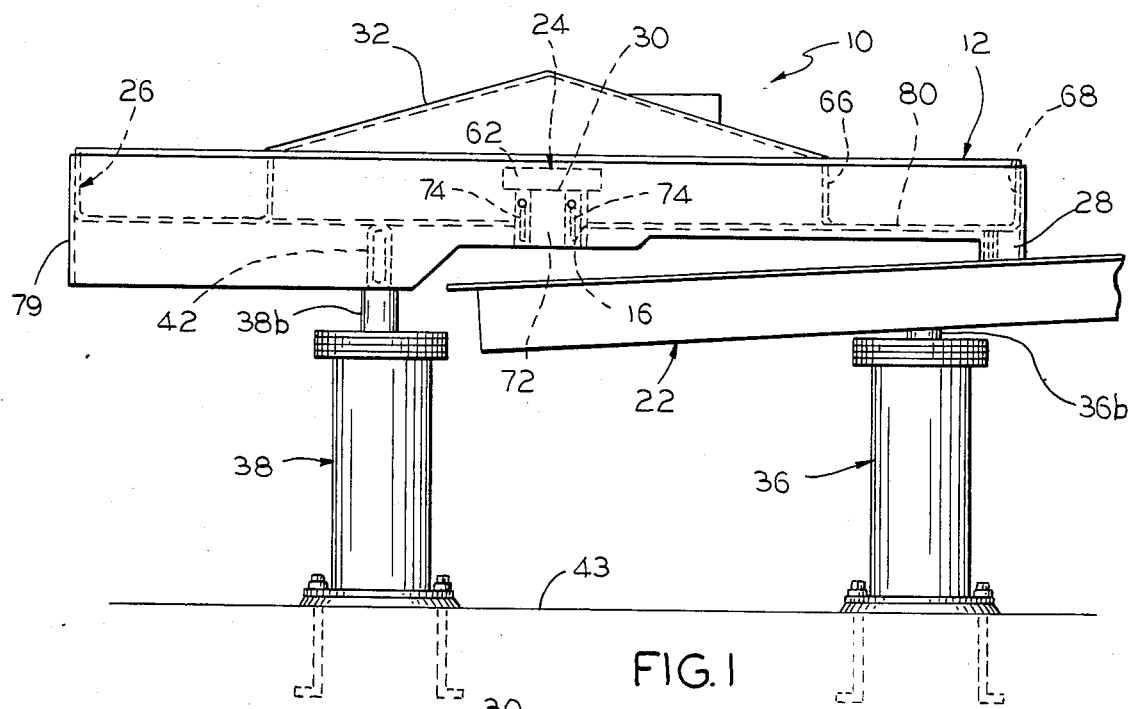
FIG. 1 is a front elevational view of a material discharge apparatus in accordance with the present invention.
Figure 3:
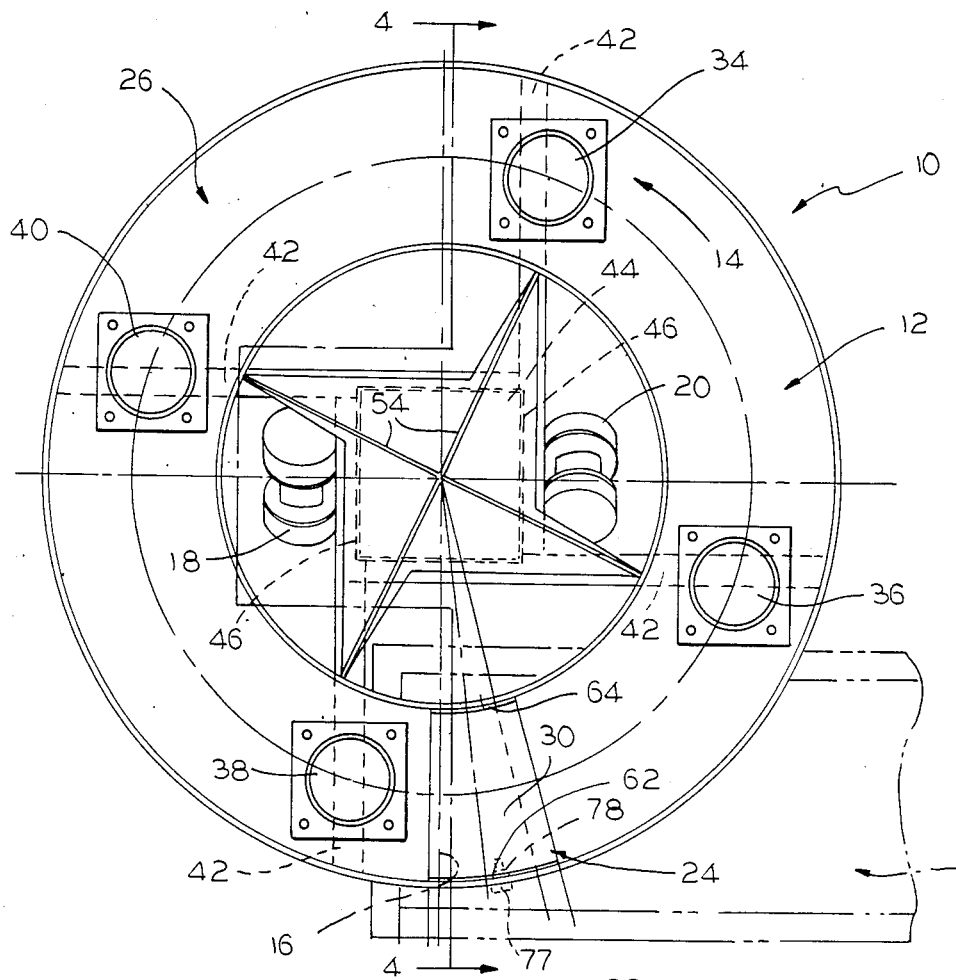
FIG. 3 is a top plan view of the material discharge apparatus of FIG. 1.

An exemplary embodiment of the invention is illustrated in FIGS. 1 and 3. The material discharge apparatus 10 includes a hopper 12 having a flow path 14 leading to a discharge opening 16. It also includes vibratory apparatus for vibrating the hopper 12 to move material along the flow path 14 toward the opening 16, such as the vibration generators 18 and 20 illustrated in FIG. 3. A conveyor 22 has a portion located below the discharge opening 16 for receiving at least a portion of the material reaching the discharge opening 16. With this arrangement, it will be appreciated by those skilled in the art that the material discharge apparatus 10 is well suited for delivering a preselected, uniform flow of material to a point remote from the hopper 12.

Figure 2:
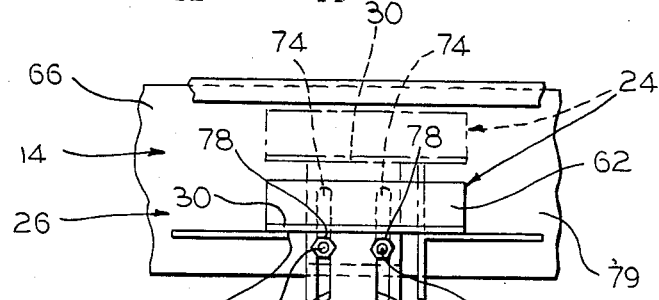
FIG. 2 is an enlarged detail cross sectional view of the vertically adjustable gate for the material discharge apparatus of FIG. 1 taken along line 2—2 of FIG. 4.
Figure 4:
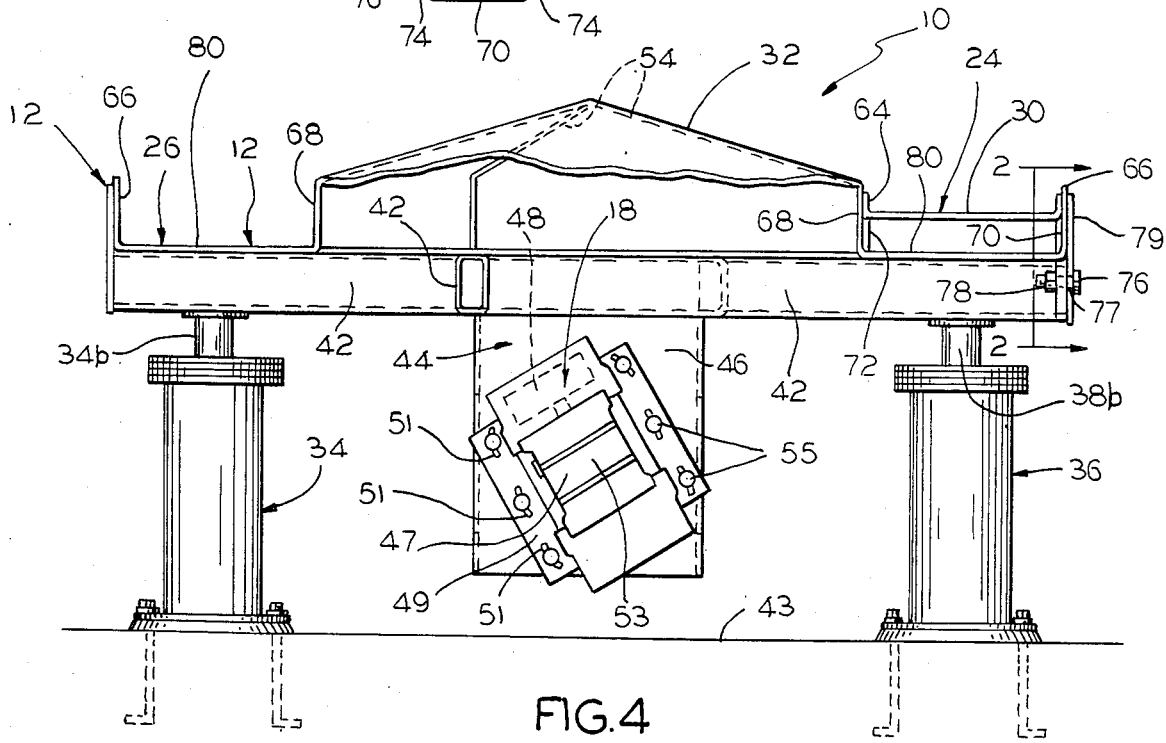
FIG. 4 is a cross sectional view of the material discharge apparatus taken along the line 4—4 of FIG. 3.

Referring to FIGS. 1, 2 and 4, the material discharge apparatus 10 includes means for discharging material through the discharge opening 16 and onto the conveyor 22 at a preselected uniform rate. In particular, the material discharging means includes a gate 24 for adjustably controlling the rate material is discharged through the discharge opening 16 onto the conveyor 22 by limiting material discharged to no more than a preselected uniform rate independent of the rate at which material actually reaches the opening 16. Moreover, the gate 24 comprises bypass means for recirculating surplus material reaching the discharge opening 16 back into the flow path 14.

Comparing FIGS. 3 and 4, the hopper 12 includes a circular trough 26 adapted to carry material to the opening 16. It will be seen that the opening 16 extends radially of the circular trough 26 and, in the illustrated embodiment, the discharge opening 16 is generally a trucated cone in shape formed by two radii fanning outwardly from the center of the circular trough. As illustrated in the drawings, the circular trough 26 defines a continuous flow path 14 within the hopper 12.

As will be appreciated by those skilled in the art, the vibration generators 18 and 20 which have the motors and weights driven in the same direction are adapted to move material along the continuous flow path 14 in the single direction represented by the arrow. The vibration generators 18 and 20 may be of the variable force type, such as shown and described in my U.S. Pat. Nos. 3,358,815 and 4,168,774. Referring to FIG. 2 it can be seen that the gate 24 is adapted to return any surplus material to a point in the continuous flow path 14 downstream of the opening 16, i.e., the surplus material will once again traverse the continuous flow path 14 defined by the circular trough 26. In other words, the surplus material is returned by the gate 24 to a point in the circular trough 26 comprising the start of the continuous flow path 14.

As previously suggested, the conveyor 22 is mounted below the hopper 12 and in practice operates independently of the vibratory conveying action of the hopper 12. The conveyor 22 may be a vibratory conveyor, a belt conveyor, a chute or the like. It will be seen by referring to FIGS. 1 and 4 that the conveyor 22 extends generally tangentially of the circular trough 26 and away from the hopper 12 for delivery of material, such as animal feed or any other bulk material, to a point where the material is to be used. The conveyor 22 could also extend radially of the hopper 12. By utilizing a continuous belt type of conveyor 22, the conveyor is adapted to continuously receive and carry away a uniform bed of material passing through the discharge opening 16.

Referring to FIG. 2, the gate 24 is vertically adjustable between the positions illustrated in phantom and solid lines, as will be described in detail hereinafter. This makes it possible to adjustably control the preselected uniform rate material is discharged through the discharge opening 16 onto the conveyor 22. Moreover, the vertically adjustable gate 24 has a generally horizontal surface portion 30 normally disposed over the discharge opening 16 in overlapping relation so as to be in generally parallel spaced relation to the circular trough 26.

As best shown in FIGS. 1, 3 and 4, the hopper 12 includes a centrally disposed elevated conical feeder surface 32 substantially coextensive with the circular trough 26. The feeder surface 32 is adapted to direct excess manually or machine loaded material into the circular trough 26 for movement along the continuous flow path 14 to the discharge opening 16. Due to the unique vertically adjustable gate 24, the hopper 12 can be maintained in a completely full condition to ensure the discharge of material at the preselected uniform rate.

In a preferred embodiment, the hopper 12 is supported on a plurality of vertically extending legs 34, 36, 38 and 40 with static springs 34b, 36b, 38b and 40b, which may be rubber, coil springs or the like, between the legs and the box frame members 42 on the hopper 12 in a manner accommodating vibration thereof. The vibratory motion of the hopper 12 is isolated from the legs and from the surface by the static springs. The hopper 12 and trough 26 are disposed in a generally horizontal plane. As shown, the vertically extending legs 34, 36, 38 and 40 are anchored to an appropriate supporting surface 43.

Referring specifically to FIGS. 3 and 4, the material discharge means 10 includes a vertically extending core or support 44 which in the illustrated embodiment is square in horizontal cross section, is fastened to and supported by the box shaped frame members 42 and forms the supporting mount for the vibratory generating members 18 and 20. It will be appreciated that the two vibration generators 18 and 20 are mounted in equal and opposite angular relation on the opposite vertically extending sides 46 of the support 44. Each vibratory apparatus 18, 20 includes a motor 47 and eccentric weights 48 and is mounted on a plate 49 which in turn is adjustably mounted on the side 46 of the support 44. Each plate 49 has arcuate shaped slots 51 with the slots having a common center 53 at the midpoint of the vibratory members 18, 20, through which slots bolts 55 are threaded into sides 46. Loosening the bolts 55 makes it possible to rotate the vibratory members 18 and 20 about the axis 53 as an additional way to vary the angle of attack of the vibratory motion on the trough for varying the conveying motion of the material in the trough. The bolts 55 are tightened when the vibratory members are identically but oppositely angled with respect to the vertical.

As will be appreciated by referring to FIGS. 3 and 4, the hopper 12 includes four box shaped frame members 42 with each one fastened to a side 46 of the support 44 and extending outwardly about 90° relative to each adjacent box shaped frame member 42. The outwardly extending frame members 42 are each supported on one of the static springs 34b, 36b, 38b and 40b carried respectively on the vertically extending legs 34, 36, 38 and 40. The support 44 and box shaped frame members 42 have a cross-shaped truss 54 secured to the top thereof for supporting the conical feeder surface 32. With this construction, the circular trough 26 and conical feeder surface 32 can be integrally formed and material can be loaded onto the conical feeder surface 32 where it will receive the same vibratory motion as the trough 26.

As best shown in FIGS. 1, 3, and 4, the vertically extending legs 34, 36, 38 and 40 and static springs 34a, 36a, 38a and 40a resiliently support the frame members 42, feeder surface 22 and trough 26, support 44 and vibration generating members 18 and 20 so that material loaded on the feeder surface 32 will be conveyed into the trough 26 and further conveyed in the trough 26 to the discharge opening 16.

As best shown in FIGS. 2 3 and 4, the surge gate 24 is preferably constructed such that the horizontal surface portion 30 overlaps the discharge opening 16 on both the upstream and downstream side of the continuous flow path 14. It will also be seen by referring to both FIG. 2 and FIG. 4 that the gate 24 includes vertical side portions 62 and 64 on opposite ends of the surface portion 30 and are adapted for slidable engagement with respective side portions 66 and 68 of the circular trough 26. Vertical plates or mounting brackets 70 and 72 are secured to the underside of the gate 24 in alignment with the vertical side portions 62, 64. As shown in FIG. 2, the mounting brackets 70 and 72 include vertical slots 74. The gate 24 is vertically adjusted by means of bolts 76 extending through apertures 77 in the skirt 79 of the trough 26, through the slots 74, and secured in adjusted position by tightening nuts 78 on the bolts 76.

As will now be appreciated, the surge gate 24 can adjustably control the rate material is discharged through the discharge opening 16 onto the conveyor 22 simply by raising or lowering the gate 24. This is done by loosening the nuts 78 and then retightening the nuts 78 in selected positions of adjustment for the gate 24 whereby the distance between the bottom 80 of the circular trough 26 and the horizontal surface portion 30 of the gate 24, in combination with the setting for the vibration generators 18 and 20, will define the preselected uniform rate at which material will be discharged through the discharge opening 16 onto the conveyor 22. Moreover, any surplus material reaching the discharge opening 16 will pass over the horizontal surface 30 of the vertically adjustable gate 24 to again traverse the continuous flow path 14 defined by the circular trough 26.

With regard to angular adjustability of the vibrators 18 and 20, this can be accomplished by loosening, adjusting and tightening bolts 55 thereby permitting the angle at which the vibrators are disposed relative to the vertical to be varied. The varying of the angles of the vibratory generating members 18, 20 to the vertical together with varying the imbalance of the eccentric weights 48 by means of the variable force apparatus disclosed, for instance, in my U.S. Pat. Nos. 3,358,815 or 4,168,774 will vary the rate at which material traverses the continuous flow path 14.

Figure 5:
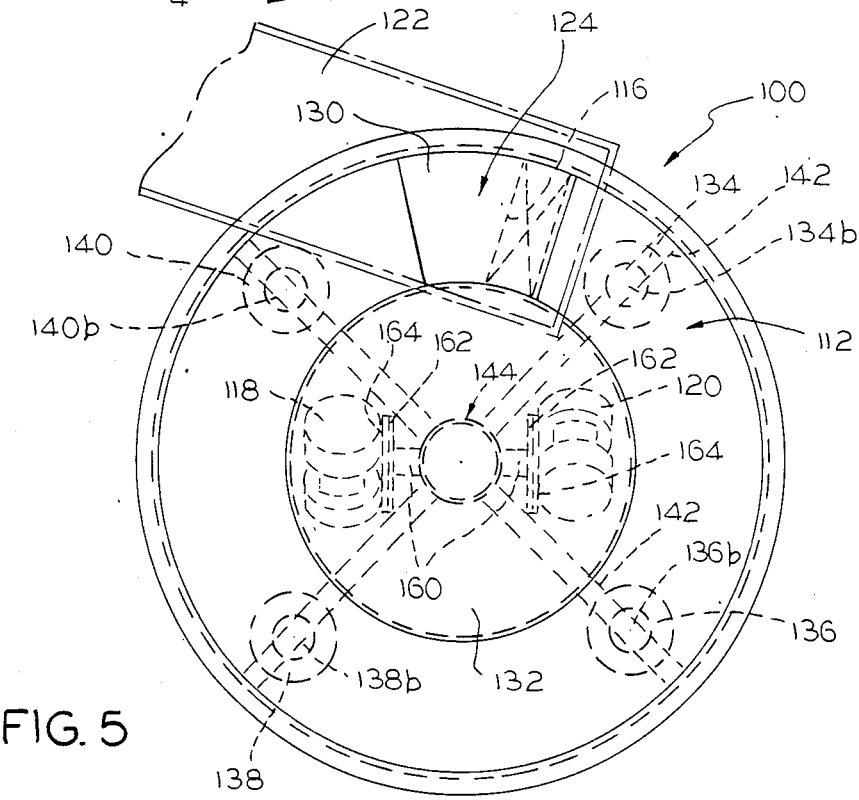
FIG. 5 is a top plan view of a modified form of the material discharge apparatus.

FIG. 5 is a modified version of a surge controlled material discharge apparatus 100 wherein a different frame structure 142, a different vibratory generating apparatus mount 144 and a different relationship of the discharge opening 116, gate 124 and conveyor 122 is provided. Specifically, the core or support 144 is circular with diametrically disposed brackets 160 having mounting plates 162 against which a plate 164 supporting each vibratory generating member 118 and 120 is adjustably affixed using the same arcuate slots and bolt arrangement of FIGS. 1-4. Four box shaped frame members 142 radiate from the core or support 144. The core or support 144 extends up to and supports the conical surface 132. The legs 134, 136, 138 and 140 have resilient static springs 134b, 136b, 138b and 140b engaging with and supporting the frame structure 142 and circular hopper 112.

The discharge opening 116 is rectangular when viewed from above (FIG. 5) with the surge gate 124 having a horizontal surface portion 130 overlapping the opening 116. The conveyor 122 extends tangentially but could extend radially from the hopper 112 below the opening 116 and is supported and driven independently of the hopper 112.

While in the foregoing there has been set forth a preferred embodiment of the invention, it will understood by those skilled in the art that the details herein given may be varied without departing from the spirit and scope of the appended claims.

I claim:

1. A material discharge apparatus, comprising:
a hopper having a material supporting surface and defining an opening;
means for vibrating said hopper to move material in a substantially horizonal flow path along said supporting surface toward said opening;
means for discharging material through said opening at a preselected uniform rate, said means for discharging material limiting material discharge to no more than said preselected uniform rate independent of the rate at which material actually reaches said opening,
said discharging means having recirculating means with an upwardly facing surface situated over said opening and an edge which intercepts material moving in said horizontal flow path; and
means are provided for changing the vertical location of said edge,
whereby material moving in said hopper in said flow path below said edge flows into the opening and material moving in said hopper in said flow path above said edge is directed by the surface on the recirculating means over the opening and back into the horizontal flow path.

2. The material discharge apparatus as defined by claim 1 wherein said hopper includes a circular trough defining said material supporting surface and flow path, said opening extending radially of said circular trough.

3. The material discharge apparatus as defined by claim 2 wherein said hopper includes a centrally disposed elevated conical feeder surface substantially coextensive with said circular trough, said feeder surface being adapted to direct loaded material into said circular trough for movement along said continuous flow path to said discharge opening.

4. The material discharge apparatus as defined by claim 3 wherein said vibrating means includes a vertically extending support disposed below said hopper, said vibrating means also including a pair of vibration generators mounted in equal and opposite angular relation on said vertically extending support, said vibration generators being adjustable to vary the rate material is moved along said circular trough toward said discharge opening.

5. The material discharge apparatus as defined by claim 1 wherein a conveyor means is mounted below said opening and extends away from said hopper, said conveyor means being adapted to continuously receive and carry away material passing through said opening.

6. The material discharge apparatus as defined by claim 1 wherein control means are provided to vary the vibrations produced by said vibrating means to vary the rate at which material reaches the opening.

7. A material discharge apparatus, comprising:
a resiliently supported hopper with a material supporting surface and defining a discharge opening;
means for vibrating said hopper to move material along said material supporting surface in a substantially horizontal flow path toward said discharge opening;
bypass means for adjustable controlling the rate material is discharged through said discharge opening, said bypass means causing any surplus material to be recirculated to said continuous flow path, said bypass means having an upwardly facing surface overlying said opening with an edge situated within said hopper to intercept flow of material within said hopper moving in said horizontal flow path; and
means for changing the vertical location of said edge within the hopper,
whereby material moving in said flow path above said edge is directed over said opening by the surface on the bypass means for recirculation and by selectively varying the position of the edge the discharge rate of the material can be chosen.

8. The material discharge apparatus as defined by claim 7 wherein said hopper is loadable and includes a circular trough defining said continuous flow path, said discharge opening being generally rectangular and extending radially of said circular trough.

9. The material discharge apparatus as defined by claim 8 wherein said vibrating means is adapted to move material around said circular trough in a single direction, said bypass means being adapted to return any surplus material to a point downstream of said discharge opening at the start of said flow path.

10. The material discharge apparatus as defined by claim 8 wherein a conveyor means is mounted below said discharge opening and extends generally tangentially of said circular trough, said conveyor means being adapted to continuously receive and carry away material passing through said opening.

* * * * *